FIG.8A

United States Patent Office 3,337,070
Patented Aug. 22, 1967

3,337,070
LOADING AND UNLOADING APPARATUS FOR DUMB WAITERS AND THE LIKE
Nicholas R. Guilbert, Jr., Glenside, Pa., assignor to Guilbert, Incorporated, Philadelphia, Pa., a corporation of Pennsylvania
Filed Aug. 24, 1964, Ser. No. 391,656
8 Claims. (Cl. 214—95)

This invention relates to apparatus for loading and unloading wheeled vehicles, from dumb waiters and the like at designated landings.

Dumb waiter installations are employed for various purposes but have required personal attention for unloading and for loading before or subsequent to unloading. The dumb waiter is not available for further use while waiting to be loaded or unloaded and a waste of time of the attendant results during dumb waiter movement.

It is the principal object of the present invention to provide loading and unloading apparatus for dumb waiters and the like for quick and effective loading and unloading without operator supervision.

It is a further object of the present invention to provide loading and unloading apparatus for dumb waiters and the like with which quick and effective loading and unloading of article supporting wheeled vehicles can be carried out with due regard for the vehicles and articles thereon being loaded and unloaded.

It is a further object of the present invention to provide loading and unloading apparatus for dumb waiters and the like which can be applied as new equipment or to existing installations of dumb waiters and which will greatly enhance the usefulness of the installation because of its ability to successively handle a plurality of vehicles.

It is a further object of the present invention to provide loading and unloading apparatus for dumb waiters and the like in which positive control of the object to be unloaded, such as a wheeled vehicle, is maintained during vertical movement of the car and during loading and unloading.

It is a further object of the present invention to provide loading and unloading apparatus for dumb waiters and the like having a positively controlled carriage with positive control of the object to be loaded and unloaded, such as a wheeled vehicle, maintained during movement of the car and during loading and unloading.

It is a further object of the present invention to provide loading and unloading apparatus for dumb waiters or the like for the handling of wheeled vehicles, which apparatus includes a carriage and in which the apparatus in itself moves in part beyond the platform of the car to a location to bridge the gap between the car and a receiving location for the vehicle.

It is a further object of the present invention to provide loading and unloading apparatus for dumb waiters and the like with which a wheeled vehicle is delivered by a carriage without the necessity for lifting the same during the delivery by the carriage and which can be operated for delivery in opposed directions.

It is a further object of the present invention to provide loading and unloading apparatus for dumb waiters and the like in which a wheeled vehicle to be delivered is discharged onto a horizontal and level receiving floor and in either direction from the car as desired.

It is a further object of the present invention to provide a loading and unloading device by which an automatic dumb waiter can be made effective for distributing vehicles at their designated landings and removing the vehicles for storage or distribution.

It is a further object of the present invention to provide a loading and unloading device which can operate in either direction, as desired, at a particular landing.

It is a further object of the present invention to provide a device of the character aforesaid which is controlled for delivery of vehicles, and for picking up vehicles, and in which the opening and closing of the car and hatch doors and the movement of the vehicle are interrelated in the control system.

Other objects and advantageous features of the invention will be apparent from the description and claims.

The nature and characteristic features of the invention will be more readily understood from the following description taken in connection with the accompanying drawings forming part thereof, in which.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is illustrated, and first to FIGS. 1 to 7, inclusive, opposite parallel vertical walls 10 and 11, and one of the vertical side walls 12 of a hatchway are shown, with access openings 13 and 14 through the walls 10 and 11 respectively, the openings 13 and 14 being normally closed by upper and lower hatchway doors 15 and 16. The doors 15 and 16 can be of any desired type but are preferably movable vertically and respectively upwardly and downwardly for access through the selected openings 13 or 14.

Figure 1:
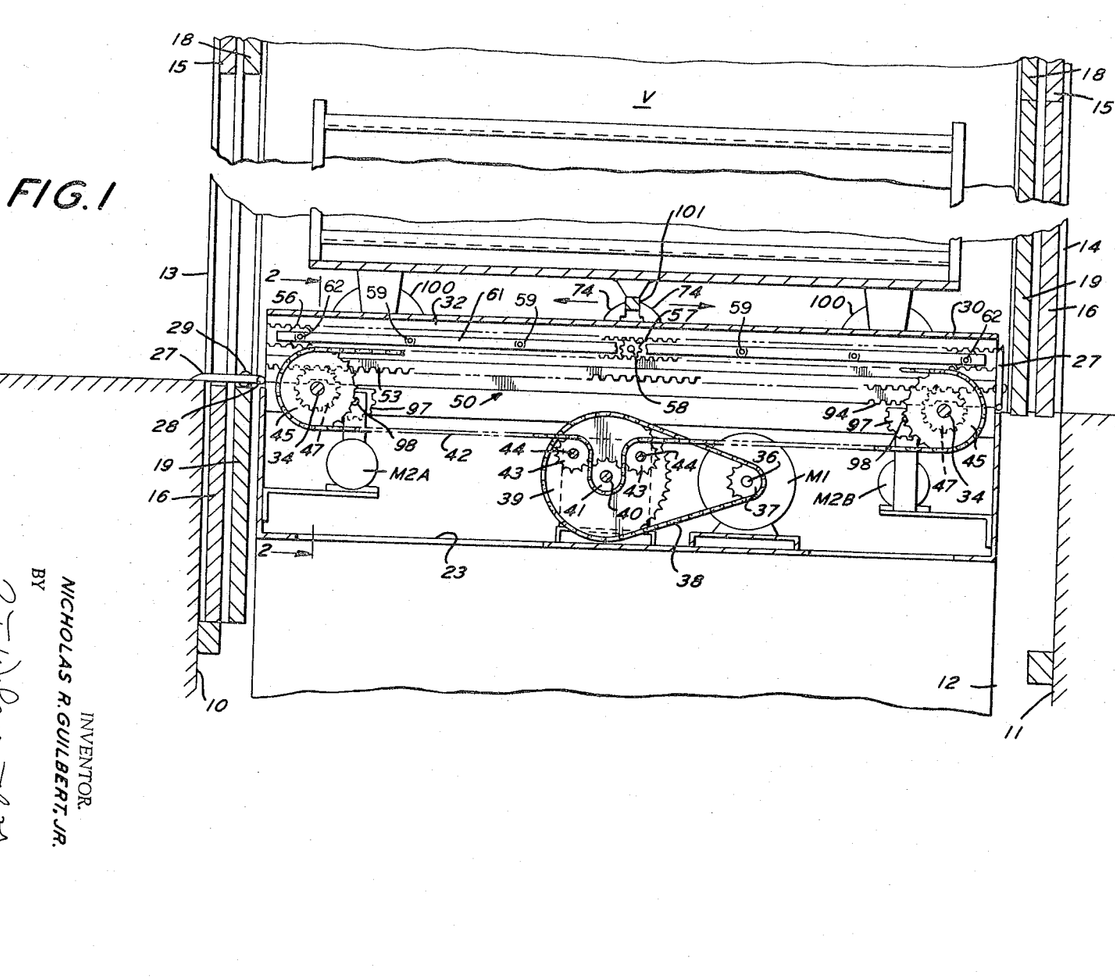
FIGURE 1 is a vertical sectional view through a dumbwaiter hatchway having a dumbwaiter car therein with a preferred form of loading and unloading apparatus in accordance with the invention, and in loaded condition.

A car 17 of well known type guided and movable along vertical rails (not shown) in the hatchway is provided and is moved vertically in the hatchway to the desired levels by operating mechanism (not shown) also of well known type.

The car 17 at each end preferably has upper and lower doors 18 and 19, of any preferred type but movable vertically and respectively upwardly and downwardly for access in the desired direction through the selected openings 13 or 14.

The access openings 13 and 14 are typical of those provided at each level at which unloading or loading is to be effected.

Figure 2:
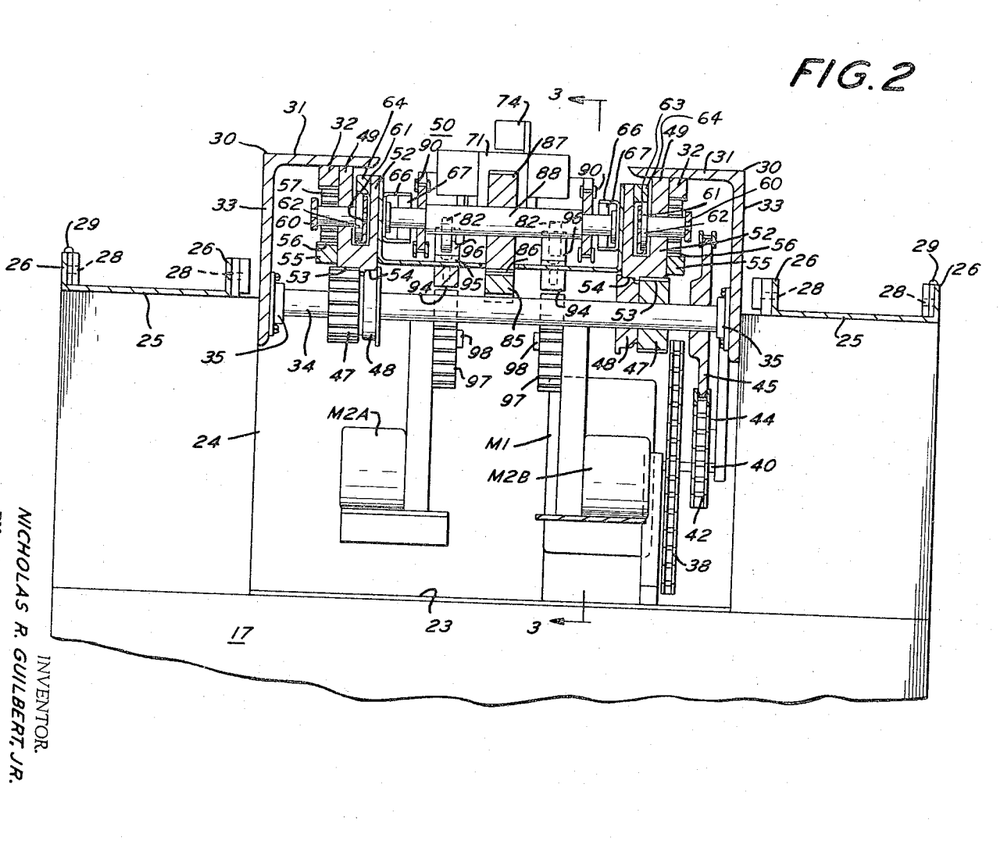
FIG. 2 is a transverse vertical sectional view taken approximately on the line 2—2 of FIG. 1.
Figure 3:
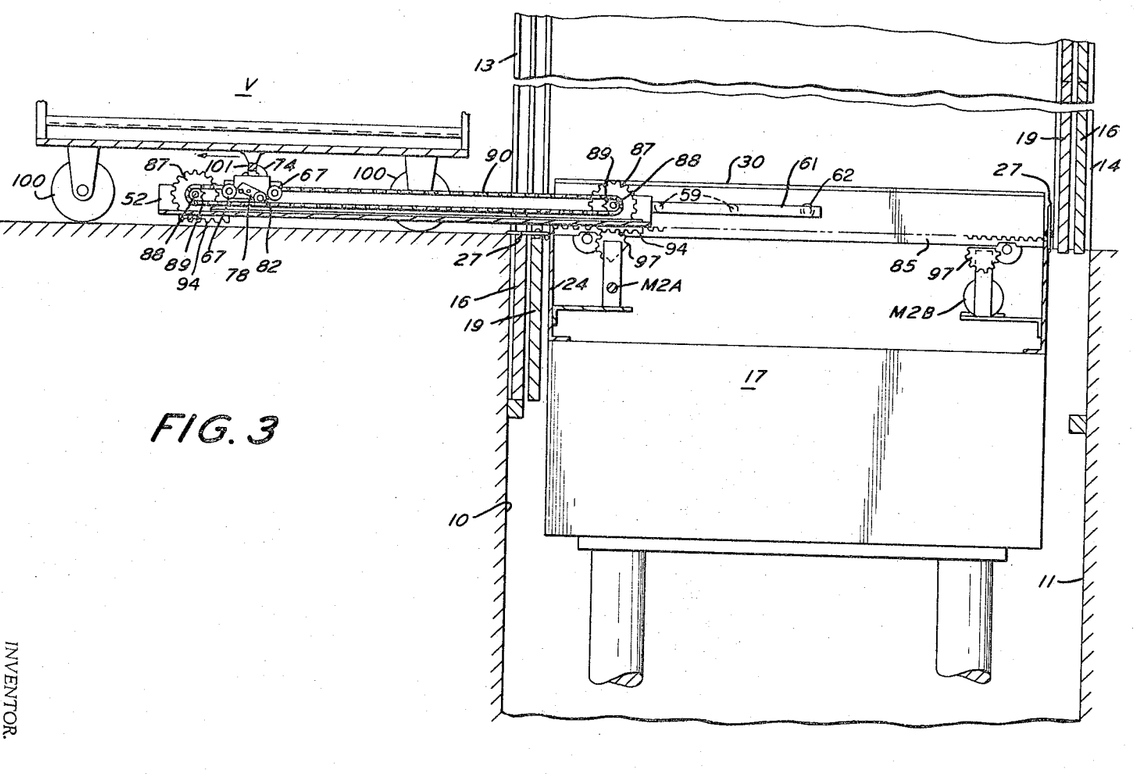
FIG. 3 is a vertical sectional view taken approximately on the line 3—3 of FIG. 2, but showing the carriage in extended condition as at the initiation of loading or the completion of unloading.

The car 17 has a horizontal bottom floor 23 on which a supporting frame 24 is mounted. The frame 24 carries a pair of spaced parallel horizontal cart wheel tracks 25, extending substantially the entire distance along the cars, with inner and outer side flanges 26. At each end one of the tracks 25 has a car and hatchway door bridging plate 27 pivoted to the track 25 by pivot pins 28, with a positioning roller 29 carried thereon and engageable with the lower car door 19 along its inner face and its top edge, for controlling the raising and lowering thereof as determined by the closing and opening of the door 19.

The supporting frame 24 is provided with opposite frame angles 30 having horizontal portions 31 to which longitudinal racks 32 are rigidly secured and vertical portions 33 to which, at each end, shafts 34 are journaled in bearings 35. The racks 32 have fixed rail bars 49 extending therealong which can also be secured to the horizontal portions 31.

The supporting frame 24 also has mounted thereon a reversible carriage positioning motor M1. The motor M1 may be of any desired type, but is preferably a capacitor start and run single phase induction torque motor dynamically braked by a winding having direct current applied thereto.

The motor M1 has an output shaft 36 with a sprocket 37 keyed thereto. The sprocket 37 has a chain 38 in engagement therewith which engages a sprocket 39 on a shaft 40 supported in the frame 24. The shaft 40 has a sprocket 41 thereon with which a chain 42 is guided by sprockets 43 on shafts 44 is in engagement. The chain 42 engages driving sprockets 45 on each of the shafts 34.

The shafts 34 each has spaced gears 47 and flanged support rollers 48 thereon.

Figure 4:
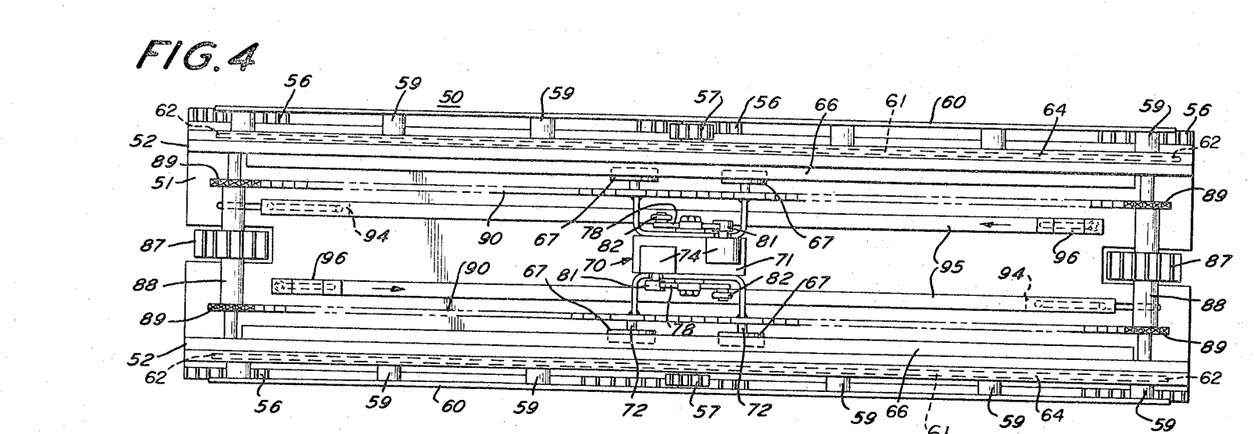
FIG. 4 is a plan view, enlarged, of the carriage removed from the car and in the loaded position.

A carriage 50 is provided for horizontal movement for loading and unloading. The carriage 50 has an elongated U-shaped frame 51 with side bars 52 having downwardly extending rack teeth 53 engaged by the gears 47 and supporting edge faces 54 engaged by the support rollers 48. The side bars 52 also have racks 55 spaced downwardly from the fixed racks 32 and with upwardly extending rack teeth 56.

The side bars 52 at the midportions thereof have gears 57 on shafts 58 engaged respectively with the racks 32 and 55. At spaced locations in front and in back of the shafts 58 spacer rollers 59 are provided rotatably connected to outer roller bars 60 and to inner roller bars 61. The rollers 59 bear on top faces of the bars 52 and bottom faces of bars 49 to provide auxiliary supports for the carriage 50 upon its extension.

At the outermost ends of the bars 61 rollers 62 may engage support faces 63 on track bars 64 carried by the side bars 52 to provide better support without binding when the carriage 50 moves to or from its extended position for loading or unloading and supplemental to the support provided by the rollers 59.

The side bars 52 also have along their inner faces guide channels 66 for the reception of the guide wheels 67 of a coupler assembly 70.

Figure 5:
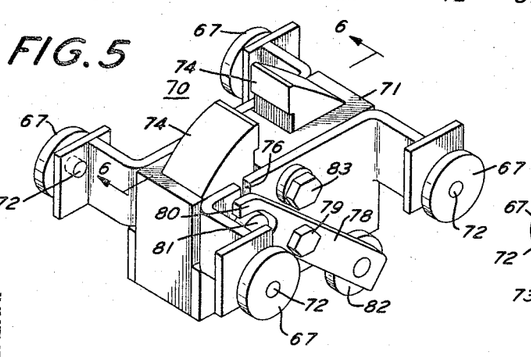
FIG. 5 is an enlarged view in perspective of the coupler for retaining the vehicle during movement of the car in the shaft and for impelling the vehicle in the desired direction.
Figure 6:
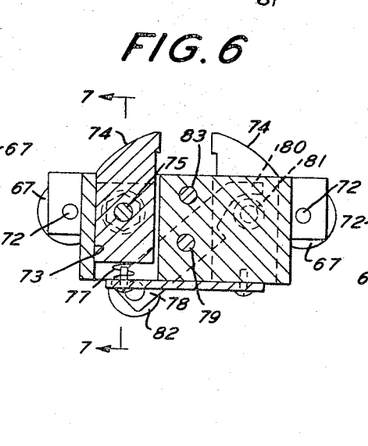
FIG. 6 is a longitudinal vertical sectional view, taken approximately on the line 6—6 of FIG. 5.
Figure 7:
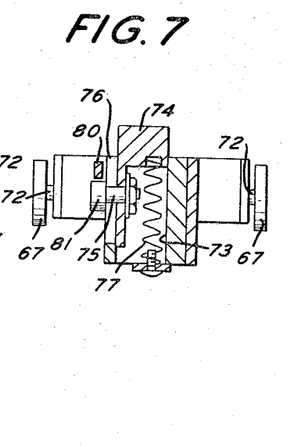
FIG. 7 is a transverse vertical sectional view taken approximately on the line 7—7 of FIG. 6.

The coupler assembly 70 includes a coupler frame 71 on the opposite sides of which the wheels 67 are mounted on stub shafts 72. Within the frame 71 at each end a guideway 73 is provided within which a coupling finger 74 is slidably mounted on a mounting pin 75. The pin 75 extends through a vertically elongated slot 76 in the side of the frame 71 which guides it in its movement. A compression spring 77 in the guideway 73 normally urges the finger 74 upwardly. In order to retract the finger 74 an actuator lever 78 pivotally mounted on the frame 71 by a pivot pin 79 has an end hook 80 engageable with a roller 81 on the mounting pin 75. The opposite end of the lever 78 has a follower roller 82 mounted thereon for cam actuation as pointed out below. A stop 83 limits the upward movement of the lever 78 and accordingly of the coupling finger 74.

In order to move the coupler assembly horizontally in either direction as desired a rack 85 is provided, fixedly secured to the frame 24 with upwardly extending rack teeth 86 for engagement by driven gears 87 on shafts 88 at each end of the carriage 50. The shafts 88 have spaced sprockets 89 thereon connected by chains 90 which are secured to the coupler frame 71 by links attached to frame 71 and to the chains 90.

The retraction of the desired coupling finger 74 for removing its pushing, pulling or holding action is preferably effected by oppositely extending cam bars 95 with upstanding cam projecting portions 96 for movement to positions for engagement with the desired follower roller 82.

Each of the cam bars 95 has extending downwardly from one end thereof a short rack 94 engageable by an interrupted or sectional gear 97 on a shaft 98 and driven respectively by reversible motors M2A and M2B. The motors M2A and M2B are preferably each a capacitor start and run single phase induction torque motor which is stalled in either direction to stop it.

The structure just described is particularly suitable for use with a wheeled vehicle V having pairs of supporting wheels 100 at each end. The vehicle V to be positioned is preferably provided intermediate its ends and between the end pairs of wheels 100 with an impeller or actuator bar 101 for engagement by and between the coupling fingers 74. The spring 77 can have a predetermined force so that force or impact of the bar 101 against the back of the finger 74 will permit forcing the finger 74 downwardly to effect a spring latching of the bar 101.

The mode of operation will now be pointed out.

Rotation of motor M1 in a selected direction is effective for driving the chain 42 which through rotation of the sprockets 45 drives the shaft 34. The shaft 34 has gears 47 which by their engagement with the rack teeth 53 impel the carriage 50 in the desired horizontal direction.

As the carriage 50 moves it is supported by the engagement of the support rollers 48 and the edge faces 54.

As the carriage 50 moves the engagement of the gears 87 with the rack 85 effects rotation of the shaft 88 which through sprockets 89 and chain 90 advances the coupler assembly 70 along the guide channels 66.

As the bars 52 are advanced the relative motion between the movable rack 55 and the fixed rack 32 with the gear 57 therebetween effects relative movement as to the auxiliary supporting bars so that the rollers 59 also aid in supporting the carriage 50.

When the coupler assembly 70 has been advanced outwardly to the desired extent the motor M2A or M2B is effective through the segmental gear 97 engaging the rack 94 to drive the cam bar 95 to engage the cam projection 96 with the follower roller 82 to retract the coupling finger 74 so that upon retraction of the coupling assembly 70 the coupling bar 101 is free. The coupling assembly 70 can thus be withdrawn from its operating connection with the vehicle and returned to its central position with the return of the carriage 50 to its initial position on the car 17.

For loading a vehicle V the coupler assembly 70 can be advanced with spring latching of the coupler bar 101 upon movement of the coupling finger 74 therebeyond, the finger 74 being depressed against the force of the spring 77 until it is moved upwardly along the bar 101.

While the operation of the structure previously described can be controlled in any desired manner a preferred form of structure for this purpose will now be described, the circuitry being restricted to that required for the loading and unloading operations and for operation in one direction.

Figure 8A:
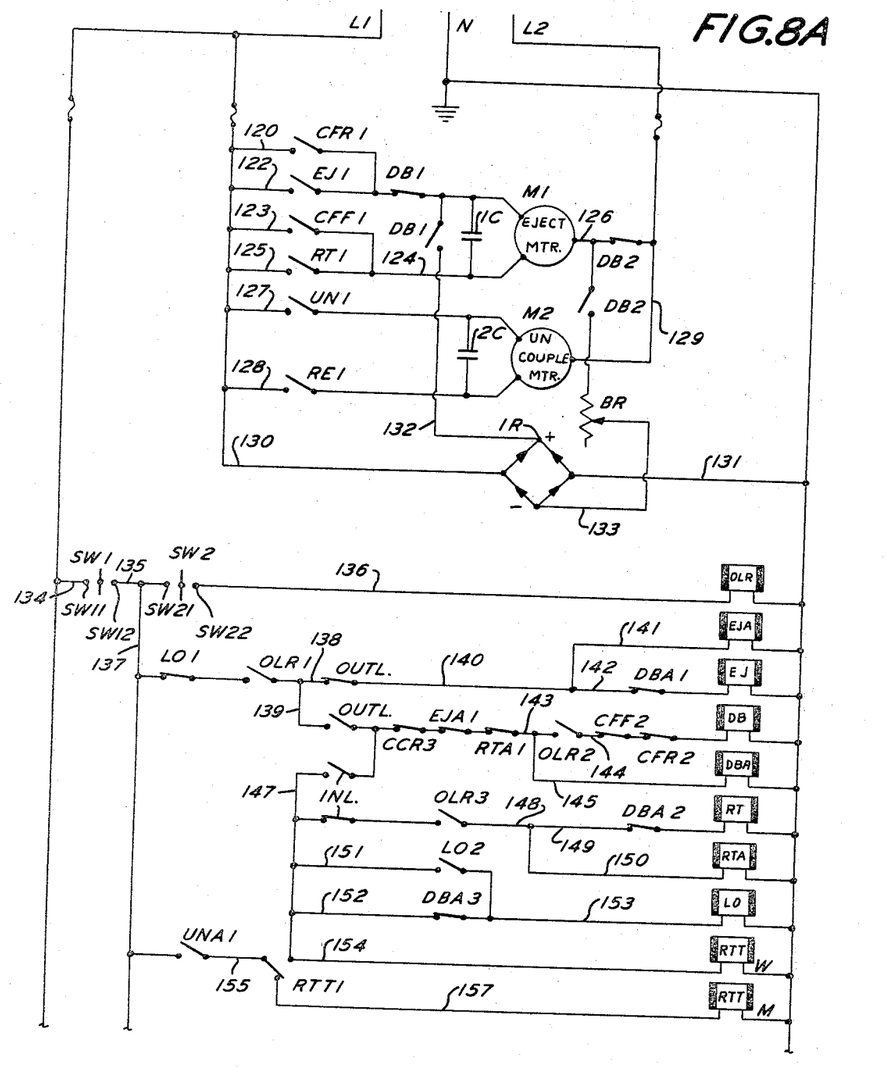
FIGS. 8A and 8B are, in sequence, a wiring diagram showing the controls for the apparatus of the present invention.
Figure 8B:
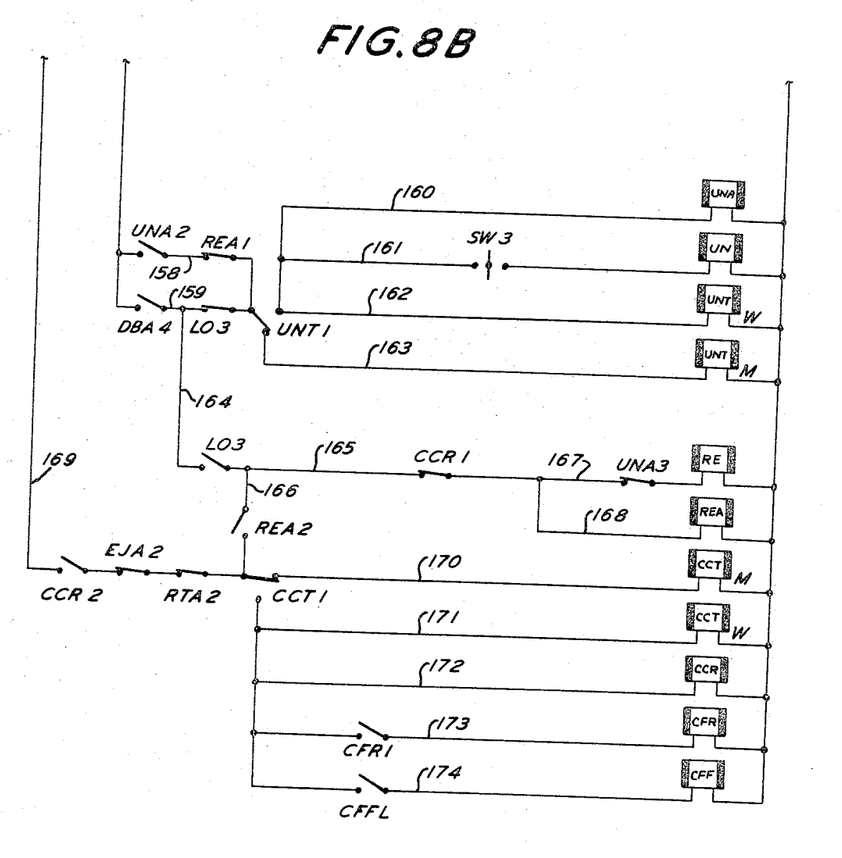

Systems have previously been proposed for automatic dispatching of a dumbwaiter car to a particular floor and the leveling thereof, and for the opening and closing of the hatchway and car doors. After the car has levelled at a landing a cam on the car drops and energizes the zone switches. For purposes of illustration this is represented as a toggle switch SW1 to effect opening of the hatchway doors 15 and 16 and the car doors 18 and 19 on a selected side.

During the car movement and until released and removed the vehicle V is kept centered on the wheel tracks 25 by the engagement of the coupler fingers 74 with the actuating bar 101.

When both sets of doors 15, 16 and 18, 19, are open limit switch contacts on a switch SW2 initiate the actuation of the apparatus. If a vehicle is on the car 17, the structure rolls the vehicle onto the landing as the carriage 50 extends itself with respect to the supporting frame 24. When the vehicle V is completely clear of the hatchway doors 15 and 16, the carriage 50 is dynamically braked to accurately stop the vehicle V regardless of its load. After the vehicle V is stopped, the uncoupling is effected and the carriage 50 is retracted into the car 17, the uncoupler resetting itself mechanically as it returns.

When the carriage 50 is wholly within the car 17, a limit switch applies dynamic braking to accurately stop the coupler assembly 70. After the coupler assembly 70 has stopped, centering circuits will center the assembly 70 if required. The doors 15, 16, 18 and 19 cannot close until the coupler assembly 70 is centered.

When the carriage 50 and coupler assembly 70 are used for loading a vehicle V onto the car 17 the same sequence takes place except that the vehicle V is coupled mechanically when the coupler assembly is advanced to it by the spring latching action of the coupling finger 74 upon meeting the coupling bar 101.

For purposes of control a plurality of relays and their contacts, limit switches, and timers operating contacts in predetermined timed relation, and a rectifier are preferably employed.

The relays preferably include:

OLR, an open limit relay, with contacts OLR 1, 2, 3;
EJ, an eject relay, with contacts EJ1;
EJA, an auxiliary eject relay, with contacts EJA1;
DB, a dynamic braking control relay with contacts DB1, 2;
DBA, an auxiliary dynamic braking control relay, with contacts DBA1, 2, 3 and 4;
UN, an uncouple control relay with contacts UN1;
UNA, an auxiliary uncouple control relay with contacts UNA1, 2, 3;
RT, a return contactor relay, with contacts RT1;
RTA, an auxiliary contactor relay, with contacts RTA1;
LO, a lockout relay, with contacts LO1, 2, 3;
RE, a reset uncoupler relay, with contacts RE1;
REA, an auxiliary reset uncoupled relay with contacts REA1, 2;
CCR, a centering circuit control relay, with contacts CCR1, 2, 3;

The timers of conventional construction preferably include:

UNT, an uncouple control timer, with contacts UNT1;
RTT, a return timer, with contacts RTT1;
CCT, a centering control timer, with contacts CCT1;

The limit switches preferably include:

OUTL, an out limit switch;
INL, an in limit switch;
CFRL, a center from rear limit switch
CFFL, a center from front limit switch.

An alternating current source is illustrated which can be a three wire single phase 230/115 volt source with line wires L1 and L2 and a grounded neutral N.

The line wire L1 is connected by a conductor 120 through normally open contact CFR1 to a conductor 121 which extends to a winding of motor M1 for rotation in one direction and in which normally closed contacts DB1 are disposed. A conductor 122 from line L1 is connected through normally open contacts EJ1 to conductor 121.

The line L1 is connected by conductor 123 in which normally open contacts CFF1 are disposed to a conductor 124 which extends to a winding of the motor M1 for rotation in the opposite direction. A conductor 125 from line L1 is connected through normally open contact RT1 to conductor 124.

A capacitor 1C is connected between conductors 121 and 124.

The motor M1 is connected by conductor 126 to the line L2 through a normally closed contact DB2.

The line wire L1 is connected by a conductor 127 through normally open contacts UN1 to a winding of one of the motors M2, such as M2A, for rotation in one direction. A conductor 128 from line wire L1 is connected through normally open contacts RE1 to a winding of the motor M2A, for rotation in the opposite direction.

A capacitor 2C is connected between the conductors 127 and 128. The motor M2A is connected by conductor 129 to conductor 126.

A rectifier 1R has an input conductor 130 connected to line wires L1 and an input conductor 131 connected to the neutral N for 120 volt input and direct current output through a conductor 132 and normally open contacts DB1 to the conductor 121 and a conductor 133 to the conductor 126 through an adjustable dynamic brake resistor BR and normally open contacts DB2.

The line wire L1 is connected through zone toggle switch SW1 with contacts SW11 and SW12 between conductors 134 and 135 and through door condition responsive switch SW2 with contacts SW21 and SW22 between conductors 135 and 136. The conductor 136 is connected through the winding of the relay OLR to the neutral wire N.

The conductor 135 is connected by a conductor 137 through normally closed contacts LO1, open contacts OLR1, to conductors 138 and 139. The conductor 138 is connected by conductor 140 through a normally closed contact OUTL to conductors 141 and 142 and thence to the neutral wire N. The conductor 139 has normally open contacts OUTL therein.

The conductor 141 has the winding of relay EJA therein. The conductor 142 has therein the normally closed contact DBA1 and the winding of the relay EJ therein.

From the conductor 139 a conductor 143 extends to conductors 144 and 145.

The conductor 143 has therein normally closed contact CCR3, normally closed contact EJA1, and normally closed contact RTA1. The conductor 144 extends through normally open contact OLRR2, normally closed contact CFF2, normally closed contact CFR2 and winding of relay DB to neutral line N.

The conductor 145 extends through the winding of relay DBA to neutral wire N.

A conductor 147 extends from the junction of conductors 139 and 143 and has normally open contacts of limit switch INL therein.

From the conductor 147, a conductor 148 extends to conductors 149 and 150. The conductor 148 has normal closed contacts of limit switch INL and normally open contacts OLR3 therein. The conductor 149 extends through normally closed contacts DBA2 and the winding of relay RT to the neutral wire N.

The conductor 150 extends through the winding of relay RTA to the neutral wire N.

From the conductor 147, conductors 151 and 152 extend to conductor 153 which extends through the winding of the relay LO to neutral wire N. The conductor 151 has therein normally open contacts LO2 and the conductor 152 has therein normally closed contacts DBA3.

From the conductor 147, a conductor 154 extends through the armature winding of return timer RTT to neutral wire N and has a contact RTT1 which is connected from conductor 137 by conductor 155 having normally open contacts UNA1.

A conductor 157 extends from a contact of RTT1 to the neutral wire N and has the motor actuating winding of return timer RTT therein.

From the conductor 137, a conductor 158 having the normally open contacts UNA2 and the normally closed contacts REA1 extends to a contact UNT1 of timer UNT and a conductor 159 having normally open contacts DBA4 and normally closed contacts LO3 extends to the same contact UNT1.

From the other contact UNT1 a conductor 160 extends through the winding of relay UNA to neutral wire N a conductor 161 extends through contacts of a manual cut out switch SW3 and through winding of relay UN, to neutral wire N, and a conductor 162 extends through the armature winding of timer UNT to neutral wire N.

A contact of UNT1 is connected by a conductor 163 through the motor actuating winding of timer UNT.

From the conductor 159, between the contacts DBA4 and LO3, a conductor 164 extends through normally open contacts LO3 to conductors 165 and 166.

The conductor 165 has normally closed contacts CCR1 therein and extends to conductors 167 and 168. The conductor 167 has normally closed contacts UNA3 and the winding of the relay RE therein and connects to the neutral wire N. The conductor 168 has the winding of the relay REA therein and connects to the neutral wire N.

The conductor 166 has normally open contacts REA2 therein and is connected to line wire LI by a conductor 169 which has normally open contacts CCR2, normally closed contacts EJA2, and normally closed contacts RTA2 therein. The junction of contacts 166 and 169 is a contact of CCT1 of timer CCT.

One contact CCT1 is connected by conductor 170 through the motor actuating winding of timer CCT to the neutral wire N.

Another contact CCT1 is connected by a conductor 171 through the armature actuating winding of timer CCT to neutral wire N. The same contact CCT1 is connected by a conductor 172 through the winding of relay CCR to the neutral wire N. The same contact CCT1 is connected by conductor 173 to neutral wire N and has the normally open contacts of limit switch CFRL and winding of relay CFR therein. The same contact CCT1 is connected by conductor 174 to neutral wire N and has the normally open contacts of limit switch CFFL and winding of relay CFF therein.

The sequence of operation will now be pointed out.

Assuming that a vehicle V is in the car 17 and is just arriving at a landing. When the car 17 is level and stops the zone switch SW1 is closed to connect contacts SW11 and SW12 between conductors 135 and 136.

When both hatchway doors 15 and 16 and car doors 18 and 19 are fully open, limit switch SW2 is closed to connect conductors 136 and 137.

The relay OLR is energized and closes its contact OLR1.

Closing of contact OLR1 establishes a circuit to energize relay EJ to supply current through contact EJ1 to energize the motor M1.

The other contacts OLR2 and OLR3 in the dynamic braking circuit and return circuit of motor M1 open and disconnect these circuits should the doors 15, 16, 18 and 19 start to close for any reason because of the control exerted by the limit switch SW2. The limit switch SW2 upon opening effects deenergization of the relay OLR which results in application of dynamic braking and discontinuance of any return.

The relay EJA is energized with the relay EJ and its contact EJA1 assures that dynamic braking cannot be applied while the motor M1 is operating.

The limit switch OUTL is set to operate when the vehicle V has passed outwardly and is clear of the doors 15 and 16. The normally closed contact of switch OUTL upon opening deenergizes the circuits for the relays EJ and EJA while the normally open contact of switch OUTL upon closing energizes the circuits for relays DB and DBA.

The normally closed contacts DB1 and DB2 assure that AC voltage is cut off while the normally open contacts apply direct current from the rectifier 1R to a winding of the motor M1 to dynamically brake the motor M1.

The contact DBA1 assures that the relay EJ is deenergized when dynamic braking is applied. The contact DBA4 energizes the uncouple timer UNT, and is set for operation at a predetermined time interval. After this interval, which is preferably of the order of one second, contact UNT1 transfers energization to the armature actuating winding of timer UNT. Energization of this winding holds the contacts in the transferred position.

The relays UN and UNA are also energized upon transfer of contact UNT1.

The contact UN1 completes a circuit to energize the motor M2A for uncoupling.

The contact UNA2 holds itself with energization of the winding of relay UN and the armature actuating winding of the timer UNT. This is effected since contact DBA4 will open as soon as carriage 50 starts to return and it is necessary to have the motor M2A energized at least until the coupler assembly 70 is retracted.

The contact UNA1 effects energization of the motor winding of the return timer RTT. After a predetermined time interval, say of the order of one second the contact RTT1 transfers energization to the armature actuating winding of the timer RTT and holds its contacts in the transferred position.

Energization of the windings of relay RT and of relay RTA is effected. Opening of contact RTA1 breaks the energizing circuit for windings of relays DB and DBA and closing of contact RT1 energizes motor M1 in a reversed direction to return the carriage 50.

The contact DBA3 upon closing effects energization of the winding of relay LO, its normally open contact LO1 and its contact LO2 providing a holding circuit. The normally closed contact LO1 opens the energizing circuit of winding of relay EJ so that no outward actuation of the carriage 50 can be effected until the car 17 is moved to another floor. It should be noted that winding of relay LO remains energized until the switch SW1 is opened and this will open only when the car 17 is to move.

The carriage 50 will continue to be moved inwardly until limit switch INL is actuated.

The normally closed contact of limit switch INL will deenergize the circuit including the windings of relays RT and RTA cutting off power to the motor M1.

The normally open contact of limit switch INL will then be effective for energizing the windings of relays DB and DBA to supply direct current for dynamic braking of the motor M1 in a similar manner to that pointed out above.

The contact DBA2 assures that the winding of relay RT is deenergized when dynamic braking is applied.

The contact DBA4, through closing of normally open contact LO3, sets up a circuit for energizing the windings of relays RE and REA. This through contact RE1 supplies energy for return of motor M2A to its original position ready for the next uncoupling operation on that side. It will be noted that subsequent uncoupling cannot occur until contact REA1 opens the circuit through the winding of relay UNA which then closes contact UNA3 setting up a circuit to the winding of relay RE.

The contacts REA2 connect the timer CCT into circuit. This timer is set at any desired time interval, preferably of about one second, after dynamic braking of the carriage 50 has been completed.

When the contact of the timer CCT is operated a contact transfer is effected and the winding of relay CCR is energized. The contact CCR1 effects deenergization of the windings of relays RE and REA cutting off power to the motor M2A. The contact CCR3 effects deenergization of the windings of relays DB and DBA cutting off dynamic braking current.

The contact CCR1 provides a holding circuit for the timer CCT and itself. It will be noted that the holding circuit is connected to line wire L1 so that it remains effective even when the car 17 is in motion and until the next movement of the carriage 50 is effected. The limit switches CFRL and CFFL will respectively be closed if the carriage 50 is moved from the central position thereby energizing the windings of relays CFR or CFF so that their respective contacts CFR1 or CFR2 will effect energization of the motor M1 to return the carriage 50 to its central position.

If for any reason a vehicle V is pushed onto the car 17 so that the carriage 50 is moved off center the limit switches CFRL and CFFL will bring about a return of the carriage 50 to its central position. This circuitry is also effective to retain the vehicle V in the center of the car 17 should it move for any reason while in transit.

When the cam controlling switch SW1 lifts on the car 17 the winding of lockout relay LO will be deenergized returning all circuits to normal and ready for another cycle.

The above sequence is for uncoupling when unloading. For loading, uncoupling does not occur. In this instance all sequences as set forth above take place, but uncoupling is prevented by opening of SW3 which may be an automatic relay contact or manually operated switch. Relay coil UN will not be energized, and therefore uncoupler motor M2 will not operate.

I claim:
1. Transfer apparatus for a car adapted for vertical movement in a hatchway and having spaced horizontal tracks for supporting a vehicle to be transferred comprising
a supporting frame between said tracks,
a carriage having side bars,
members carried by said frame in supporting relation to said side bars for supporting said carriage for horizontal movement in projecting relation beyond the car,
said members including longitudinally horizontally extensible roller elements engaging said supporting frame and said side bars,
means for impelling said carriage in a predetermined direction including a reversible motor on said frame, a rack on said carriage, a gear engaging said rack, and driving connections between said motor and said gear,
a vehicle impelling assembly mounted for horizontal movement along said carriage,
said impelling assembly including a releasable vehicle coupler centrally disposed between said side bars and intermediate the ends of said side bars and movable in a selected direction from a central location to a position beyond the car,
members for advancing said vehicle impelling assembly including an elongated flexible member connected to said impelling assembly and
interengaging members on said carriage and said supporting frame for actuating said flexible member upon movement of said carriage with respect to said supporting frame.
2. Transfer apparatus as defined in claim 1 in which said motor has a brake for controlling the movement of said carriage to the desired extent of advance.
3. Transfer apparatus as defined in claim 1 in which said coupler includes a coupling finger,
said finger has a resilient member urging it in a direction for coupling, and
members are provided for retracting said coupling finger.
4. Transfer apparatus as defined in claim 3 in which said last members include a cam controlled lever for retracting said coupling finger, and
a cam for actuating said lever.
5. Transfer apparatus as defined in claim 4 in which said cam has members for moving it for actuation of said lever responsive to the positioning of said carriage.
6. Transfer apparatus as defined in claim 1 in which centering means is provided for controlling the position of said carriage on said frame when said carriage is within the confines of the car.
7. Transfer apparatus as defined in claim 1 in which said interengaging members include a rack on said frame and a gear engaging said rack, and said gear is connected to said flexible member.
8. In combination with a car adapted for movement in a vertical hatchway having hatchway doors at hatchway access locations movable to open position, and car doors movable to open positions,
said car having a supporting frame with spaced horizontal tracks for supporting a vehicle to be transferred,
a transfer carriage having side bars with members in supporting relation to said side bars for supporting said carriage for horizontal movement to a position in projecting in relation beyond the car,
members for impelling said carriage in a predetermined direction along said frame,
an impeller assembly mounted for horizontal movement along said carriage,
members for advancing said impeller assembly,
coupling members carried by said assembly,
said coupling members including a finger having a resilient member urging it in one direction, and
a positioning member urging it in an opposite direction,
said positioning member having a cam for selective positioning with respect thereto, and
a motor for positioning said cam.

References Cited

UNITED STATES PATENTS

| Re. 24,963 | 4/1961 | Carroll. | |
| 1,828,307 | 10/1931 | Been. | |
| 1,864,711 | 6/1932 | Buettell | 214—16.1 |
| 1,869,046 | 7/1932 | Buck. | |
| 1,937,189 | 11/1933 | Buettell. | |
| 2,051,062 | 8/1936 | Turner et al. | 214—16.1 |
| 2,847,630 | 8/1958 | Holt et al. | 318—212 |
| 2,937,867 | 5/1960 | Schweig | 318—212 |

FOREIGN PATENTS 833,174   3/1952   Germany.

GERALD M. FORLENZA, *Primary Examiner.*

R. B. JOHNSON, *Assistant Examiner.*